Oct. 9, 1962 G. E. KINDIG ET AL 3,057,573
TAKE-UP CHAMBER FOR PHOTOGRAPHIC FILM
Filed April 22, 1959 2 Sheets-Sheet 1

Guilford E. Kindig
Harvey H. Dudley
INVENTORS

BY R. Frank Smith
   Karl T. Haromey
ATTORNEYS

Oct. 9, 1962  G. E. KINDIG ET AL  3,057,573
TAKE-UP CHAMBER FOR PHOTOGRAPHIC FILM
Filed April 22, 1959  2 Sheets-Sheet 2

Guilford E. Kindig
Harvey H. Dudley
INVENTORS

BY
ATTORNEYS

United States Patent Office 3,057,573
Patented Oct. 9, 1962

3,057,573
TAKE-UP CHAMBER FOR PHOTOGRAPHIC FILM
Guilford E. Kindig and Harvey H. Dudley, Rochester, N.Y., assignors to Eastman Kodak Company, Rochester, N.Y., a corporation of New Jersey
Filed Apr. 22, 1959, Ser. No. 808,086
3 Claims. (Cl. 242—71)

This invention relates to photographic apparatus, and particularly to take-up chambers for photographic film.

One object of the invention is to provide a film take-up chamber of variable effective diameter so that its capacity may increase to accommodate the enlargement of the coil of film therein as additional film is fed thereinto. Another object of the invention is to provide a take-up chamber in which the film coil therein is supported by rollers to prevent frictional contact with the walls of the chamber. Still another object of the invention is to provide a film take-up chamber in which there is little or no relative movement between the convolutions of film therein. A still further object of the invention is to provide such a take-up chamber constructed as a unit and mounted in the camera as a complete sub-assembly. Other objects will appear from the following specification, the novel features being particularly pointed out at the end thereof.

In photographic apparatus, such as cameras and projectors, roll film may be coiled upon a spool which is inserted into a supply chamber from which the film is propelled across an exposure aperture through suitable guideways to a take-up chamber where it is coiled upon itself for temporary storage before being returned to the original spool for removal from the apparatus. Such apparatus has the advantage of being quickly loaded and rapidly operated but it is frequently difficult to cause film to coil upon itself smoothly and without excessive drag within the take-up chamber. If the take-up chamber is of invariable effective diameter, the tendency of the coil of film to expand and the resulting sliding of the convolutions with respect to each other as the film is pushed into the chamber causes a substantial braking effect when only a few convolutions have been formed within the chamber. The employment of an expandable scroll spring as a guide for the outer convolution is partially effective in overcoming this difficulty but is undesirable because of its tendency to scratch the film and because the force required to feed film to the chamber increases materially as the coil increases in diameter. Our invention is particularly directed to a structure which will overcome these difficulties.

Coming now to the drawings wherein like reference characters denote like parts throughout;

Figure 1:
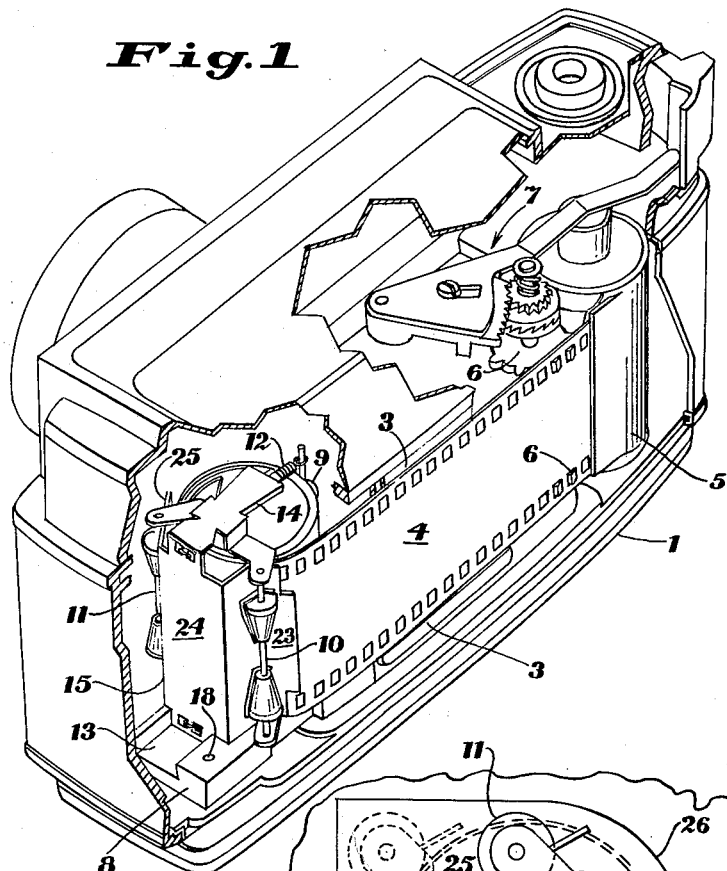
FIGURE 1 is a perspective view of a photographic camera with portions thereof broken away to show the take-up device with film therein and the means by which the film is advanced to the take-up chamber.

To illustrate an embodiment of the invention a camera 1 is shown having an exposure aperture 2 and film guiding means 3 which, in conjunction with other structural parts of the camera body and closure lid, maintain the film 4 in a flat, properly orientated position in the focal plane. The film is drawn from the cassette 5 and pushed across the exposure aperture into the take-up chamber by means of drive sprockets 6 actuated by advance mechanism 7.

Figure 3:
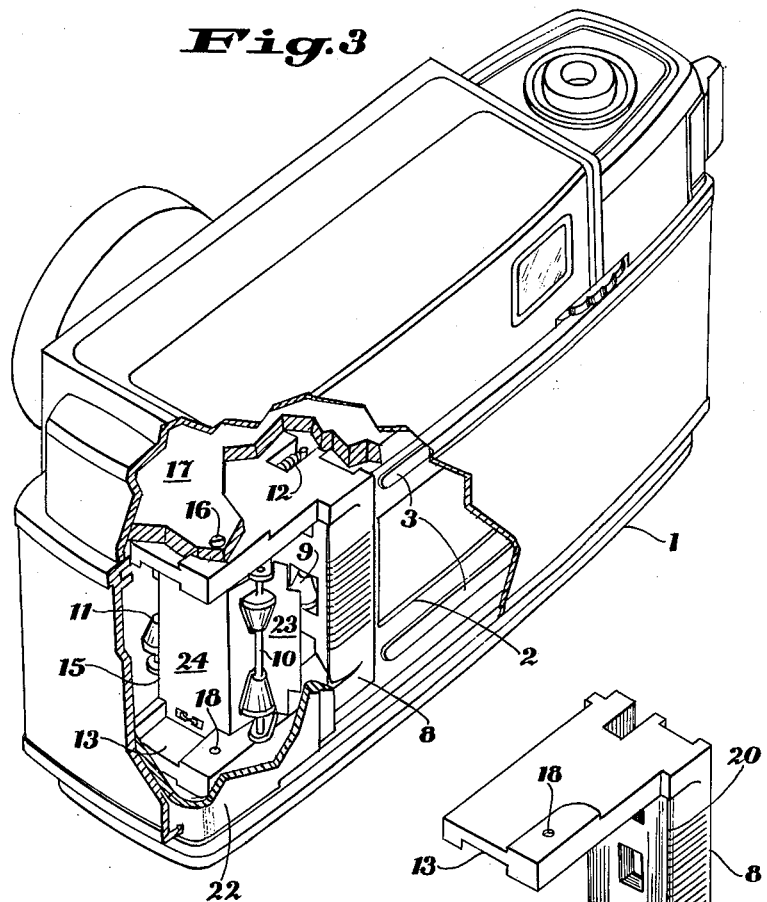
FIGURE 3 is a perspective view of a photographic camera with portions thereof broken away to show the film take-up device with no film therein.
Figure 4:
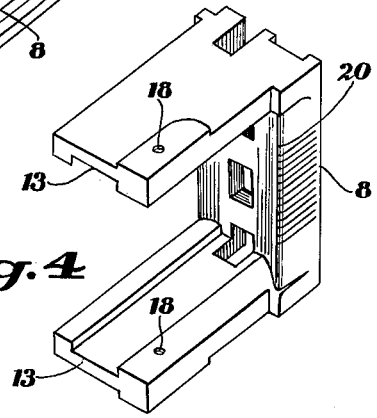
FIGURE 4 is a perspective view of the supporting frame for the film take-up device which permits ready assembly of the take-up device in the camera body.

The take-up device comprises a removable unit consisting of a supporting frame 8, a fixed roller 9, two movable rollers 10 and 11, a movable roller carrier 15, and coil springs 12. The supporting frame 8 is adapted to fit into a corresponding recess in the camera frame as shown in FIG. 3. Fixed roller 9 is pivotally mounted in the supporting frame with its axis parallel to the generatrix of the coil of film which is formed within the device. The parallel top and bottom members of the supporting frame as shown in FIG. 4 are provided with grooves 13 which cooperate with respective projections 14 on the top and bottom of the movable roller carrier 15 to allow the movable roller carrier member and rollers 10 and 11 carried thereby to be moved relative to roller 9 between a position wherein the axes of the three parallel rollers are conjugate with the points of an equilateral triangle to a position wherein the axes describe an elongated isosceles triangle with the fixed roller axis at the apex thereof. Light coil springs 12 are attached between the movable roller carrier and the supporting frame to resiliently urge the movable roller carrier toward the fixed roller. The take-up device, assembled in the supporting frame, is held in the recess in the camera body by means of screws 16 which extend through the adjacent walls 17 of the camera body into threaded holes 18 in the top and bottom members of the supporting frame.

Figure 2:
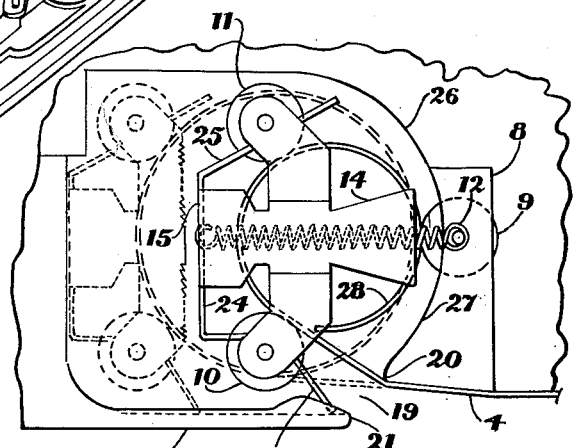
FIGURE 2 is a schematic plan view of the take-up device showing in solid lines the rollers in contact with a single convolution of film and showing in broken lines the rollers in contact with what would correspond to the larger outer convolution of a coil of film.

To load the camera, the loose end of film is inserted into the slot 19 defined by the vertical corner 20 of the supporting frame 8 and by surface 21 of cover plate 22. As the film enters the slot it is guided by the wing-like extension 23 on the movable roller support 15 into contact with the inner surface of roller 10. The camera is then closed and, as the film is pushed further into the chamber by means of the advance mechanism, the end of the film is guided by the inner surface, the back wall 24 of the carrier member and by guide wing 25 into tangential contact with roller 11, and then by wall 26 of the camera body into tangency with roller 9. Further advancing of the film brings it into contact with surface 27 of the supporting frame, which guides it against the incoming film to form a complete convolution 28 tangent to and located by the rollers as shown in solid lines in FIG. 2. In a preferred embodiment the rollers comprise shafts located behind the guide surfaces provided with conically shaped roller segments thereon, as shown, which project through the respective guide surfaces. This construction eliminates the possibility of the film's being jammed by improper contact with a roller as the end of the film is inserted into the take-up device. As additional film is driven into the take-up unit, the inner convolution is caused to rotate and additional convolutions are built up on the first convolution. The resulting increase in the size of the coil as convolutions are added thereto causes the resiliently urged movable rollers 10 and 11 to be displaced, while still locating and supporting the coil. When the take-up unit is full, the outer convolution will have displaced the movable roller support and its rollers to the position shown in broken lines in FIG. 2. As the film is then rewound into the cassette it simply uncoils as it is drawn out of the take-up unit. A freely rolling action is at all times maintained by the rollers in resilient supporting contact with the outer film convolution.

While the embodiment shown and described employs a construction which allows the removal of the entire take-up unit in one piece, it would be possible to incorporate the above described type of film take-up unit integrally and permanently into the camera body. The former construction, however, facilitates easy assembly and repair or replacement of the unit if such should become necessary. This construction also makes possible a camera body construction which may readily be adapted to accommodate various film sizes utilizing either this type of spoolless take-up system or a conventional take-up spool.

Other modifications of the invention will be clear to those skilled in the art and the present invention is to be limited only by the scope of the appended claims.

Having now particularly described our invention, what we desire to secure by Letters Patent of the United States and what we claim is:

1. A photographic camera including a body member provided with a film take-up device comprising; a stationary roller adapted to rotate freely about an axis in fixed relation to said camera, two movable rollers parallel to said stationary roller and freely rotatably about their respective axes, a movable member supporting said movable rollers; means comprising light tension springs resiliently urging said movable member and said movable rollers toward said stationary roller; wall means defining a chamber in said body member enclosing said film take-up device and provided with a slot through which film may be fed into said take-up device; a stationary film guiding surface defined by said wall means and terminating at said slot, said surface provided with a recess within which said stationary roller is located, and a movable film guiding member supported by said movable means and including surfaces adapted to guide said film into tangential supported relation with said movable rollers as film is fed into said device.

2. A construction according to claim 1 in which that portion of said wall means adjacent said slot and said movable rollers is provided with a recess; said movable film guiding means including a lip extending into and movable along said recess to guide the end of said film strip into said device as said end is fed into said slot.

3. A construction according to claim 1 in which said movable member and said movable film guiding means comprise a unitary structure formed from a single piece of sheet metal.

References Cited in the file of this patent

UNITED STATES PATENTS

| | | |
|---|---|---|
| 999,352 | Waring | Aug. 1, 1911 |
| 1,806,774 | Webster | May 26, 1931 |
| 1,872,018 | Street | Aug. 16, 1932 |
| 2,336,278 | Mihalyi | Dec. 7, 1943 |
| 2,381,033 | Bolsey | Aug. 7, 1945 |
| 2,573,188 | Dyken | Oct. 30, 1951 |
| 2,614,763 | Horton et al. | Oct. 21, 1952 |
| 2,706,094 | Dyken | Apr. 12, 1955 |
| 2,775,410 | Schwartz et al. | Dec. 25, 1956 |
| 2,812,910 | Egan | Nov. 12, 1957 |
| 2,843,332 | Kawazura et al. | July 15, 1958 |